United States Patent
Song et al.

(10) Patent No.: US 9,828,520 B2
(45) Date of Patent: Nov. 28, 2017

(54) INTERLAYER COMPOSITION AND DEVICES MADE THEREFROM

(71) Applicant: XEROX CORPORATION, Norwalk, CT (US)

(72) Inventors: Guiqin Song, Milton (CA); Nan-Xing Hu, Oakville (CA); Ping Liu, Mississauga (CA); Adela Goredema, Ancaster (CA); Biby Esther Abraham, Mississauga (CA); Cuong Vong, Hamilton (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/099,937

(22) Filed: Apr. 15, 2016

(65) Prior Publication Data

US 2017/0298248 A1  Oct. 19, 2017

(51) Int. Cl.

| | |
|---|---|
| *C09D 163/00* | (2006.01) |
| *C09D 129/02* | (2006.01) |
| *C09D 11/03* | (2014.01) |
| *H01B 3/22* | (2006.01) |
| *C08K 5/5435* | (2006.01) |
| *C09D 161/28* | (2006.01) |
| *C09D 7/00* | (2006.01) |
| *B32B 17/00* | (2006.01) |
| *C09D 7/06* | (2006.01) |

(52) U.S. Cl.
CPC .......... *C09D 163/00* (2013.01); *C08K 5/5435* (2013.01); *C09D 11/03* (2013.01); *C09D 129/02* (2013.01); *C09D 161/28* (2013.01); *H01B 3/22* (2013.01); *B32B 17/00* (2013.01); *B32B 2307/202* (2013.01); *C09D 7/00* (2013.01); *C09D 7/06* (2013.01)

(58) Field of Classification Search
None
See application file for complete search history.

(56) References Cited

U.S. PATENT DOCUMENTS

| | | | |
|---|---|---|---|
| 7,270,694 B2 | 9/2007 | Li et al. | |
| 7,749,300 B2 | 7/2010 | Chretien et al. | |
| 8,324,294 B2 | 12/2012 | Wu et al. | |
| 8,361,350 B2 | 1/2013 | Wu et al. | |
| 8,765,025 B2 | 7/2014 | Wu et al. | |
| 9,174,432 B2 | 11/2015 | Liu et al. | |
| 2004/0224252 A1* | 11/2004 | Kondo | H05K 3/185 430/270.1 |
| 2006/0199099 A1* | 9/2006 | Arao | G03F 7/0382 430/270.1 |
| 2007/0099357 A1 | 5/2007 | Li et al. | |
| 2009/0148600 A1 | 6/2009 | Li et al. | |
| 2009/0181183 A1 | 7/2009 | Li et al. | |
| 2009/0274834 A1 | 11/2009 | Chopra et al. | |
| 2010/0143591 A1 | 6/2010 | Wu et al. | |
| 2012/0043512 A1 | 2/2012 | Liu et al. | |
| 2013/0029034 A1 | 1/2013 | Liu et al. | |
| 2014/0312284 A1 | 10/2014 | Liu et al. | |
| 2014/0377457 A1 | 12/2014 | Liu et al. | |
| 2015/0240101 A1 | 8/2015 | Chopra et al. | |
| 2015/0259556 A1 | 9/2015 | Chopra et al. | |

FOREIGN PATENT DOCUMENTS

| | | |
|---|---|---|
| EP | 0 947 532 A1 | 10/1999 |
| EP | 0 947 532 B1 | 1/2006 |
| JP | 2006-89530 A * | 4/2006 |

OTHER PUBLICATIONS

Machine translation of JP 2006-89530 (no date).*
Liu et al., "Metal Nanoparticle Ink Dispersion," U.S. Appl. No. 15/098,143, filed Apr. 13, 2016.
Song et al., "Interlayer Composition for Electronic Printing,"U.S. Appl. No. 14/981,419, filed Dec. 28, 2015.
The Dow Chemical Company, "Product Safety Assessment—Dow Reactive Diluents," Revised May 3, 2012, pp. 1-7.
Goredema et al., "Nanosilver Ink Compositions Comprising Polystyrene Additives," U.S. Appl. No. 14/594,746, filed Jan. 12, 2015.
Goredema et al., "Nanosilver Ink Compositions Comprising Clay Additives," U.S. Appl. No. 14/573,191, filed Dec. 17, 2014.
Salami et al., "Silver Nanoparticie Ink", U.S. Appl. No. 15/061,618, filed Mar. 4, 2016.
Naveen Chopra, Ink Composition and Method of Determining a Degree of Curing of the Ink Composition, U.S. Appl. No. 14/216,366, filed Mar. 17, 2014.

* cited by examiner

*Primary Examiner* — Marc Zimmer
(74) *Attorney, Agent, or Firm* — MH2 Technology Law Group LLP (57) ABSTRACT

A composition formed from ingredients comprising: an epoxy; a polyvinyl phenol; a cross-linking agent; an epoxy silane; and a solvent is disclosed. A printable medium and other devices made from the composition are also disclosed.

14 Claims, 5 Drawing Sheets

INTERLAYER COMPOSITION AND DEVICES MADE THEREFROM

DETAILED DESCRIPTION

Field of the Disclosure

The present disclosure is directed to an interlayer composition and devices formed therefrom.

Background

Solution processable conducting materials including metal nanoparticles play an important role in the electronic industry. Solution processable metal nanoparticles can be used to fabricate various conducting features in electronic devices such as electrodes and electrical interconnectors by low-cost solution deposition and patterning techniques. The conductive features formed from metal nanoparticles can be chosen to provide sufficient conductivity to enable proper operations for the electronic devices fabricated.

Previously Xerox® Corporation developed silver nanoparticles and inks which can be solution processed by ink jet printing for various electronic device applications. Xerox® Corporation has invented a nanosilver particle which is stabilized by an organoamine. U.S. Pat. No. 8,765,025, which is hereby incorporated by reference herein in its entirety, describes a metal nanoparticle composition that includes an organic-stabilized metal nanoparticle and a solvent in which the solvent selected has the following Hansen solubility parameters: a dispersion parameter of about 16 MPa0.5, or more, and a sum of a polarity parameter and a hydrogen bonding parameter of about 8.0 MPa0.5 or less. U.S. Pat. No. 7,270,694, which is hereby incorporated by reference herein in its entirety, describes a process for preparing stabilized silver nanoparticles comprising reacting a silver compound with a reducing agent comprising a hydrazine compound by incrementally adding the silver compound to a first mixture comprising the reducing agent, a stabilizer comprising an organoamine and a solvent.

U.S. patent application Ser. No. 13/866,704, which is hereby incorporated by reference herein in its entirety, describes stabilized metal-containing nanoparticles prepared by a first method comprising reacting a silver compound with a reducing agent comprising a hydrazine compound by incrementally adding the silver compound to a first mixture comprising the reducing agent, a stabilizer comprising an organoamine, and a solvent. U.S. patent application Ser. No. 14/188,284, which is hereby incorporated by reference herein in its entirety, describes conductive inks having a high silver content for gravure and flexographic printing and methods for producing such conductive inks.

Xerox® Corporation has developed flexographic and gravure inks based on silver nanoparticle technology. U.S. patent application Ser. No. 14/594,746, which is hereby incorporated by reference herein in its entirety, describes in the Abstract thereof a nanosilver ink composition including silver nanoparticles; polystyrene; and an ink vehicle. A process for preparing a nanosilver ink composition is described comprising combining silver nanoparticles; polystyrene; and an ink vehicle. A process for forming conductive features on a substrate using flexographic and gravure printing processes is described comprising providing a nanosilver ink composition comprising silver nanoparticles; polystyrene; and an ink vehicle; depositing the nanosilver ink composition onto a substrate to form deposited features; and heating the deposited features on the substrate to form conductive features on the substrate.

U.S. patent application Ser. No. 14/573,191, which is hereby incorporated by reference herein in its entirety, describes in the Abstract thereof a nanosilver ink composition including silver nanoparticles; a clay dispersion; and an ink vehicle. A process for forming conductive features on a substrate is described including providing a nanosilver ink composition comprising silver nanoparticles; a clay dispersion; and an ink vehicle; depositing the nanosilver ink composition onto a substrate to form deposited features; and heating the deposited features on the substrate to form conductive features on the substrate. Inks have been successfully formulated in non-polar solvents such as decalin and bicyclohexyl and successfully printed using inkjet, gravure or flexographic printing technologies.

There are many kinds of nanoparticle inks on the market. These inks have different polarities. Metal nanoparticle inks can be easily dispersed in suitable solvents and used to fabricate various conducting features in electronic devices such as electrodes and electrical interconnectors by low-cost solution deposition and patterning techniques and especially by ink jet printing technologies. However, it has been found that some metal nanoparticle inks may overspread on many substrate materials, which can reduce print quality. This can be especially problematic for inks that are non-polar. The interaction between ink and substrates depends not only on the properties of the inks, but also on the surface properties (surface roughness, polarity etc.) of the substrates.

Another issue that concerns metal nanoparticle inks is that it is desirable for the conductive features formed from metal nanoparticles, such as silver nanoparticle inks, to have sufficient adhesion and mechanical robustness characteristics to enable proper electronic device fabrications and functions. However, adhesion on certain substrates such as glass and flexible plastic substrates, such as Polyimide, PolyEthylene-Naphthalate (PEN) and PolyEthylene Terephthalate (PET) may not be adequate in some instances for robust device fabrications. The adhesion issue was tackled previously by addition of a small amount of polymeric materials including polyvinyl butyral (PVB) resin in silver conducting inks as an adhesion promoter. This approach is suitable for some applications. A potential disadvantage of this method is that the electrical conductivity of printed conductive features from such inks could, in some instances, be decreased significantly. Therefore, it is necessary to develop effective methods to improve adhesion and enable formation of devices with robust mechanical properties without sacrificing electric conductivity of metal nanoparticle inks used in electronic device applications.

Currently available compositions and methods are suitable for their intended purposes. However a need remains for improved electronic device compositions and methods. Further, a need remains for an improved method for providing sufficient adhesion and mechanical robustness characteristics while also maintaining desired electrical conductivity of the printed conductive features. Further, a need remains for an interlayer composition having one or more of the characteristics of film forming capability, adequate film adhesion, in embodiments, adequate film adhesion to glass substrates; ability to accept conductive ink, in embodiments silver ink, wherein a film formed from the interlayer allows desired adhesion of conductive ink to the film, non-polar solvent based silver ink wettability, good print quality and desired conductivity.

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains. However, for purposes of claim interpretation, the language directly recited in the present specification, including any definitions expressly recited herein, is to take precedence over the language and definitions provided by any documents incorporated by reference herein.

SUMMARY

An embodiment of the present disclosure is directed to a composition formed from ingredients comprising: an epoxy; a polyvinyl phenol; a cross-linking agent; an epoxy silane; and a solvent, Another embodiment of the present disclosure is directed to a printable medium. The printable medium comprises a substrate and a film on the substrate. The film comprises a cured composition formed from ingredients comprising: an epoxy; a polyvinyl phenol; a cross-linking agent; an epoxy silane; and a solvent.

Yet another embodiment of the present disclosure is directed to a device. The device comprises a substrate and a film on the substrate. The film comprises a cured composition formed from ingredients comprising: an epoxy; a polyvinyl phenol; a cross-linking agent; an epoxy silane; and a solvent. A conductive feature is on the film.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

It should be noted that some details of the figure have been simplified and are drawn to facilitate understanding of the embodiments rather than to maintain strict structural accuracy, detail, and scale.

DESCRIPTION OF EMBODIMENTS

In embodiments, electronic device compositions and methods are provided comprising interlayer compositions having sufficient adhesion and/or mechanical robustness characteristics while also maintaining desired electrical conductivity of the printed conductive features. Further, interlayer compositions are provided having one or more of the characteristics of: film forming capability, adequate film adhesion, adequate film adhesion to various substrates such as glass substrate, ability to accept conductive ink, in embodiments silver ink, a film formed from the interlayer allows desired adhesion of conductive ink to the film, non-polar solvent based silver ink wettability, good print quality of non-polar inks thereon and desired conductivity. In embodiments, interlayer compositions providing a combination of these desired characteristics are described; that is, interlayer compositions that provide more than one or all of the following characteristics: film forming ability, a smooth cured interlayer film surface, film adhesion to substrates including glass, ink adhesion to film, wettability of nanoparticle conductive ink including aqueous nanoparticle inks and non-polar solvent based nanoparticle silver inks, good print quality of non-polar inks thereon and desired conductivity.

The interlayer compositions can be employed for any suitable or desired application including, but not limited to, printable sensors or other electronic circuit devices for smart packaging. The interlayer compositions meet the requirements of ability to print electronic circuits on conventional surfaces such as polycarbonate, polyethylene terephthalate (PET), polyimide, polyethylene naphthalate (PEN), etc., while also exhibiting suitable adhesion and planarization characteristics, compatibility with electronic inks, and, in embodiments, do not require additional surface treatment. The interlayer compositions can be employed in multi-layer circuit printing and can be used to prepare electrical insulation layers.

An interlayer composition which can dramatically improve the adhesion between substrates and printed conductive layers constructed from various non-polar metal nanoparticle inks, including non-polar Xerox® silver nanoparticle inks, is provided. In embodiments, the interlayer composition is made from a mixture of ingredients comprising an epoxy (e.g., an epoxy compound or polyepoxide), a polyvinyl phenol, a cross-linking agent, an epoxy silane and a solvent. Optionally, a small amount of surface additives can be included to improve wetting and spreading properties. Further, an optional catalyst can be included to enhance the curing process.

In embodiments, the interlayer composition has properties including a viscosity of from about 2 centipoise (cps) to about 150 cps at about 25° C. and a surface tension of from about 18 mN/m (millinewtons per meter) to about 40 mN/m at about 25° C. In embodiments, the cured interlayer composition has a glass transition temperature of from about minus 10° C. to about 100° C. The low glass transition helps the nanoparticle ink adhesion on the interlayer film. In embodiments, the cured interlayer film also has a water contact angle of from about 65 degrees to about 95 degrees and the cured interlayer film surface roughness Ra is from about 1 nanometer to about 10 nanometers.

The interlayer can be fabricated by any suitable or desired process. In embodiments the interlayer can be prepared by solution process methods including spin coating, dip coating, inkjet printing, and the like, on various substrates, followed by annealing at suitable temperatures for curing.

The interlayer has good adhesion on a variety of substrates including, for example, glass and polyimide. In addition to good adhesion, experimental results showed high quality of interlayer film uniformity.

The conductive features can be fabricated by any suitable or desired method. In embodiments, the conductive features can be prepared by solution processing techniques such as ink jet printing on the substrates with a pre-applied interlayer of the present disclosure. The conductive features can have relatively high conductivity with significantly improved adhesion after annealing at a suitable temperature.

The interlayer solution is stable and the coating can be cured at different temperatures. The interlayer composition can be cured at any suitable or desired temperature for any suitable period of time. In embodiments, the coated composition herein can be cured at a temperature of from about 80 to about 200° C., or from about 100 to about 180° C., or from about 120 about 160° C. for a period of from about 0.5 to about 5 hours, or from about 1 to about 4 hours, or from about 1 hour to about 3 hours. In embodiments, the interlayer composition can be cured at about 160° C. for about 1 to about 3 hours.

Since the cured interlayer film is an excellent electrical insulator, the electrical conductivity of metal nanoparticle inks will not be affected by the present interlayer coating composition. The resulting interlayer, after curing, provides a film having balanced properties for printing electronics including suitable water contact angle for controlling the ink wettability, surface smoothness, electrical insulating properties, suitable glass transition for controlling the flexibility for flexible electronics fabrications, and other properties as described herein.

The interlayer composition can include a polyvinylphenol (PVP) to provide film forming properties, an epoxy which serves as a building block to enable specific structural properties, a cross-linking agent, optionally a surfactant, and a solvent. In addition, the interlayer composition includes an epoxy functionalized silane (also referred to herein as an epoxy silane). The epoxy silane functions as a knob for effectively controlling the printing behavior, such as wetting, spreading and printing line width, of nanoparticle inks printed on the interlayer. By including the epoxy functionalized silane in the interlayer formulation, the print quality, including printed line width, an be controlled to the level desired. In an embodiment, the interlayer composition is free of, that is, does not contain hardening agents or hardening compounds.

Examples of suitable epoxies can include Novolac epoxy resins, such as epoxy phenol novolacs (EPN) and epoxy cresol novolacs (ECN), examples of which are well known in the art, such as o-Cresol-glycidyl ether, as well as other aromatic epoxy resins or compounds such as p-tert-butyl-phenyl-glycidyl ether; and aliphatic epoxy, such as, glycidyl epoxy resins, Trimethylolpropane triglycidyl ether, Neopentyl glycol diglycidyl ether, Poly(propylene glycol) diglycidyl ether, $C_{12}$-$C_{14}$ glycidyl ether, such as Alkyl ($C_{12}$-$C_{14}$) glycidyl ether, Ethylhexylgylcidylether, 1,4-Butanediol-diglycidyl ether, Polyglycerol-3-glycidyl ether, Cyclohexanedimethanol-diglycidyl ether, Glycerol-trigylcidyl ether, Penthaerythritol-polyglycidyl ether, 2-Ethyhexyl-glycidyl ether; 1,6-Hexanediol-diglycidyl ether; Tris-(hydroxyl phenyl)-methane-based epoxy and cycloaliphatic epoxies.

Commercially available epoxies include GNS SG-8008, GNS SG-8116 and the POLYPOX® family of glycidyl ethers, such as POLYPOX R3, POLYPOX R6, POLYPOX R7, POLYPOX R9, POLYPOX R11, POLYPOX R12, POLYPOX R14, POLYPOX R16, POLYPOX R17, POLYPOX R18, POLYPOX R19, POLYPOX R20 and POLYPOX R24, all of which are available from DOW Chemical Company of Midland, Mich. Other suitable aromatic or aliphatic epoxies could be employed in addition to sir in place of those listed above.

In embodiments, an interlayer composition herein comprises an aliphatic epoxy compound of formula 1, or an epoxy polymer made therefrom:

(1)

where X can be a saturated or unsaturated, linear, branched or cyclic aliphatic group having 1 to 70 carbon atoms, such as 1 to 60, 1 to 30, 2 to 20 or 2 to 10 carbon atoms, and at least one oxygen atom; Y can be defined as a glycidyl group, epoxy group, oxyalkyl (—OR) group or hydroxyl group; R can be an alkyl, such as $C_1$ to $C_6$ alkyl; $R^1$ can be a hydrogen atom, an alkyl, such as $C_1$ to $C_6$ alkyl, or an —$OR^2$ group, where $R^2$ can be a $C_1$ to $C_3$ alkyl or an epoxy group; m ranges from 1 to 10, such as 1 to 5; n ranges from 1 to 20, such as 1 to 5 and q ranges from 0 to 10, such as 1 to 5. In an example, m and q are both 1. In another embodiment, m, n and q are all 1. The at least one oxygen atom in the aliphatic group X can be included as any oxygen containing group, including, but not limited to, glycidyl groups, epoxy groups, ether groups, carbonyl groups, carboxylic acid ester groups, hydroxyl groups, oxyalkyl (—OR) groups and combinations thereof.

In one embodiment, X is of the formula (i)

(ii)

(iii)

In an embodiment, Y is an epoxy group of the formula:

In certain embodiments, the epoxy comprises one or more of the following aliphatic compounds or an epoxy polymer made therefrom, where the aliphatic compounds are selected from compounds of formulae:

wherein n is from 1 to 15, such as 1 to 10, or from 3 to 9. Specific examples of the epoxy compound as described by formula (1) include:

1,4-Butanediyl diglycidyl ether:

1,6-Hexanediol diglycidyl ether

1,4-Cyclohexanedimethanol diglycidyl ether:

Neopentyl glycol diglycidyl ether

1,2,3-Propanetriol glycidyl ethers

Trimethylolpropane triglycidyl ether [CAS#030499-70-8]

Castor oil, epichlorohydrin polymer

Pentaerythritrol polyglycidyl ether [30973-88-7]

Poly(ethylene glycol) diglycidyl ether

Wherein n is from 2 to 15
Poly(propylene glycol) diglycidyl ether

Wherein n is from 2 to 10.

As described above, the epoxy can comprise any of the epoxy compounds described herein and/or epoxy polymers formed from the epoxy compounds, where the epoxy compounds are different than the epoxy silanes described herein. Epoxy polymers, also referred to herein as epoxy resins, can be made by employing the epoxy compounds as monomers that can be reacted to form polyepoxides of any desired length or molecular weight, such as oligomers or longer chain polymers. Techniques for forming epoxy polymers from epoxy compounds, such as those disclosed herein, are known in the art.

The epoxy can be provided in the interlayer composition in any suitable or desired amount. In embodiments, the epoxy is present in an amount of from about 5 to about 45 percent, or from about 10 to about 35 percent, or from about 15 to about 25 percent, by weight, based on the total weight of the interlayer composition.

Any suitable or desired polyvinyl phenol can be selected for the present interlayer compositions. In embodiments, the polyvinyl phenol is selected from the group consisting of poly(4-vinylphenol), poly(vinylphenol)/poly(methyl acrylate), poly(vinylphenol)/poly(methyl methacrylate), poly(4-vinylphenol)/poly(vinyl methyl ketone), and combinations thereof.

In embodiments, a polyvinyl phenol having a weight average molecular weight (Mw) of from about 10,000 to about 50,000, or from about 15,000 to about 40,000, or from about 20,000 to about 30,000, is selected.

The polyvinyl phenol can be provided in the interlayer composition in any suitable or desired amount. In embodiments, the polyvinyl phenol is present in an amount of from about 0.5 to about 30 percent, or from about 1 to about 20 percent, or from about 2 to about 10 percent, by weight, based on the total weight of the interlayer composition.

The interlayer composition further contains a cross linking agent. In an embodiment, the cross-linking agent is a melamine resin. Any suitable or desired melamine resin can be selected for embodiments herein. In certain embodiments, the melamine resin is a poly(melamine-co-formaldehyde) copolymer. Any suitable or desired poly(melamine-co-formaldehyde) polymer can be selected for the present interlayer compositions. In embodiments, the poly(melamine-co-formaldehyde) is selected from the group consisting of methylated poly(melamine-co-formaldehyde), butylated poly(melamine-co-formaldehyde), isobutylated poly(melamine-co-formaldehyde), acrylated poly(melamine-co-formaldehyde), methylated/butylated poly(melamine-co-formaldehyde), and combinations thereof.

The cross-linking agent can be provided in the interlayer composition in any suitable or desired amount. In embodiments, the cross-linking agent, such as a poly(melamine-co-formaldehyde) polymer, is present in an amount of from about 0.5 to about 15 percent, or from about 1 to about 10 percent, or from about 2 to about 5 percent, by weight, based on the total weight of the interlayer composition.

The interlayer composition also includes an epoxy silane. As described above, the epoxy silanes can be added in an effective amount for controlling print line width, as desired. Without the addition of the epoxy silanes, the compositions of the present disclosure can potentially exhibit relatively poor image quality due to overspreading, which is attributed to the non-polar ink not being compatible with the interlayer. When added to the interlayer formulation, the epoxy silanes can improve compatibility with non-polar inks, such as a non-polar nano-silver ink. It is believed this is due to the relatively non-polar nature of the epoxy silanes compared to some other epoxies.

Examples of epoxy silanes include those of general formulae 3 and 4, below:

$R^3$, $R^4$ and $R^5$ can be independently selected from the group consisting of alkyl groups, including $C_1$ to $C_6$ alkyl groups such as methyl, ethyl, propyl and butyl groups, and —$OR^6$ groups, where $R^6$ is an alkyl group, including $C_1$ to $C_6$ alkyl groups such as methyl, ethyl, propyl and butyl groups; y ranges from 0 to 10 and z ranges from 1 to 12. In an embodiment, one, two or three of the $R^3$, $R^4$ and $R^5$ groups are —$OR^6$ where $R^6$ is as defined above. Examples of suitable commercially available epoxy silanes of formula 3 include 2-(3,4-Epoxycyclohexyl)-ethyltrimethoxysilane, 2-(3,4-Epoxycyclohexyl)-ethyltriethoxysilane, Tris(dodecycloxyl)(2-{7-oxabicyclo[4.1.0]heptan-3-yl}silane.

Examples of commercially available epoxy silanes of formula 4 include 3-(2,3-Epoxypropoxypropyl)-methyldimethoxysilane, 3-(2,3-Epoxypropoxypropyl)trimethoxysilane, and 3-(2,3-Epoxypropoxypropyl)-Epoxypropoxypropyl)triethoxysilane. Any combination of the compounds of formulae 3 and 4 can be employed. Any other epoxy silanes that exhibit a degree of non-polarity sufficient to improve print quality, such as by reducing line width compared to the same composition used without the epoxy silane, can also be employed in addition to or in place of the compounds of formulae 3 and 4.

The epoxy silane can be provided in the interlayer composition in any suitable or desired amount. In embodiments the epoxy silane is present in an amount of from about 0.05 to about 5 percent, or from about 0.25 to about 3 percent, or from about 0.5 to about 1.5 percent, by weight, based on the total weight of the interlayer composition.

The interlayer composition comprises from about 10 to about 50 weight percent solids, or from about 15 to about 40 weight percent solids, or from about 20 to about 30 weight percent solids, based on the total weight of the interlayer composition. In specific embodiments, the interlayer composition contains a selected solids content of less than about 30 weight percent solids, based on the total weight of the interlayer composition. For example, in embodiments, the interlayer composition contains a solids content of from about 10 to less than about 30 weight percent solids, or from about 15 to less than about 30 weight percent solids, or from about 20 to less than about 30 weight percent solids, based on the total weight of the interlayer composition.

Any suitable or desired solvent can be selected for the present interlayer compositions. In embodiments, the solvent is selected from the group consisting of propylene glycol methyl ether acetate, toluene, methyl isobutyl ketone, butylacetate, methoxypropylacetate, xylene, tripropyleneglycol monomethylether, dipropyleneglycol monomethylether, propoxylated neopentylglycoldiacrylate, and combinations thereof.

In embodiments, the solvent can be a non-polar organic solvent selected from the group consisting of hydrocarbons such as alkanes, alkenes, alcohols having from about 7 to about 18 carbon atoms such as undecane, dodecane, tridecane, tetradecane, hexadecane, 1-undecanol, 2-undecanol, 3-undecanol, 4-undecanol, 5-undecanol, 6-undecanol, 1-dodecanol, 2-dodecanol, 3-dedecahol, 4-dedecanol, 5-dodecanol, 6-dodecanol, 1-tridecanol 2-tridecanol, 3-tridecanol, 4-tridecanol, 5-tridecanol, 6-tridecanol, 7-tridecanol, 1-tetradecanol, 2-tetradecanol, 3-tetradecanol, 4-tetradecanol, 5-tetradecanol, 6-tetradecanol, 7-tetradecanol, and the like; alcohols such as terpineol (α-terpineol), β-terpineol, geraniol, cineol, cedral, linalool, 4-terpineol, 3,7-dimethylocta-2,6-dien-1ol, 2-(2-propyl)-5-methyl-cyclohexane-1-ol; isoparaffinic hydrocarbons such as isodecane, isododecane; commercially available mixtures of isoparaffins such as Isopar™ E, Isopar™ G, Isopar™ H, Isopar™ L, Isopar™ V, Isopar™ G, manufactured by Exxon Chemical Company; Shellsol® manufactured by Shell Chemical Company; Soltrol® manufactured by Chevron Phillips Chemical Company; Begasol® manufactured by Mobil Petroleum Co., Inc.; IP Solvent 2835 manufactured by Idemitsu Petrochemical CO., Ltd; naphthenic oils; aromatic solvents such as benzene, nitrobenzene, toluene, ortho-, meta-, and paraxylene, and mixtures thereof; 1,3,5-trimethybenzene (mesitylene); 1,2-, 1,3-, and 1,4-dichlorobenzene and mixtures thereof, trichlorobenzene; cyanobenzene; phenylcyclohexane and tetralin; aliphatic solvents such as isooctane, nonane, decane, dodecane; cyclic aliphatic solvents such as dicyclohexyl and decalin; and mixtures and combinations thereof.

In an embodiment, a single solvent can be used. In other embodiments, two or more solvents can be used. The total amount of solvent or solvents can be provided in the interlayer composition in any suitable or desired amount. In embodiments, the total solvent is present in an amount of from about 50 to about 90 percent, or from about 60 to about 80 percent, or from about 70 to about 80 percent, by weight, based on the total weight of the interlayer composition.

Any suitable or desired surfactant can optionally be selected for the present interlayer compositions. In embodiments, the surfactant is selected from the group consisting of a silicone modified polyacrylate, a polyester modified polydimethylsiloxane, a polyether modified polydimethylsiloxane, a polyacrylate modified polydimethylsiloxane, a polyester polyether modified polydimethylsiloxane a a low molecular weight ethoxylated polydimethylsiloxane, polyether modified polydimethylsiloxane, polyester modified polymethylalkylsiloxane, polyether modified polymethylalkylsiloxane, aralkyl modified polymethylalkylsiloxane, polyether modified polymethylalkylsiloxane, polyether modified polydimethylsiloxane, and combinations thereof.

In embodiments, the surfactant is a solvent based siloxane. In embodiments, the surfactant is a silicone modified polyacrylate. The surfactant can be a polysiloxane copolymer that includes a polyester modified polydimethylsiloxane, commercially available from BYK Chemical with the trade name of BYK® 310; a polyether modified polydimethylsiloxane, commercially available from BYK Chemical with the trade name of BYK® 330; a polyacrylate modified polydimethylsiloxane, commercially available from BYK Chemical with the trade name of BYK®-SILCLEAN 3700 (about 25 weight percent in methoxypropylacetate): or a polyester polyether modified polydimethylsiloxane, commercially available from BYK Chemical with the trade name of BYK® 375. The surfactant can be a low molecular weight ethoxylated polydimethylsiloxane with the trade name Silsur® A008 available from Siltech Corporation. For further detail, see U.S. patent application Ser. No. 13/716,892, filed Dec. 17, 2012, of Liu et al, which is hereby incorporated by reference herein in its entirety.

In embodiments, the surfactant is present and is selected from the group consisting of a polyester modified polydimethylsiloxane, a polyether modified polydimethylsiloxane, a polyacrylate modified polydimethylsiloxane, a polyester polyether modified polydimethylsiloxane, a low molecular weight ethoxylated polydimethylsiloxane, and combinations thereof.

The surfactant can be provided in the interlayer composition in any suitable or desired amount. In embodiments, the surfactant is present in an amount of from about 0.01 to about 2 percent, from about 0.1 to about 1.5 percent, or from about 0.5 to about 1 percent, by weight, based on the total weight of the interlayer composition.

The interlayer composition can optionally comprise a catalyst. Any suitable or desired catalyst can be selected for the present interlayer compositions. In embodiments, the catalyst is selected from the group consisting of amine salts of dodecylbenzene sulfonic acid (DDBSA), para toluene sulfonic acid, triflouromethane sulfonic acid, and combinations thereof.

The catalyst can be provided in the interlayer composition in any suitable or desired amount. In embodiments, the catalyst is present in an amount of from about 0.05 to about 1.5 percent, or from about 0.08 to about 1.0 percent, or from about 0.1 to about 0.5 percent, by weight, based on the total weight of the interlayer composition.

Figure 1:
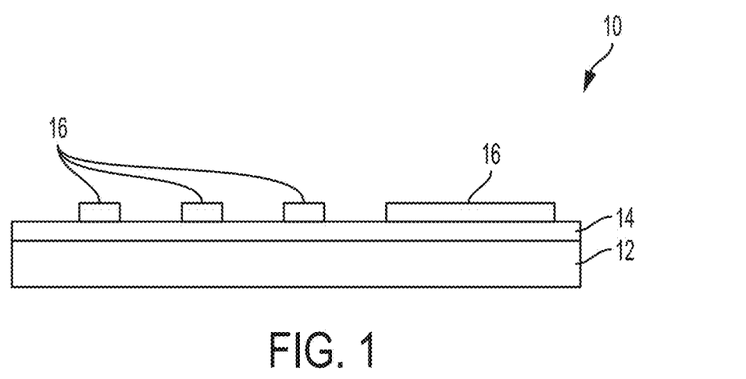
FIG. 1 illustrates a device, according to an embodiment of the present disclosure.

In embodiments, a device 10 is provided comprising a substrate 12; an interlayer 14; and optionally conductive features 16; wherein the interlayer 14 comprises a film, in embodiments a thermally or otherwise cured film, formed from any of the interlayer compositions of the present disclosure. For example, the interlayer composition can comprise any of the epoxies described herein; a polyvinyl phenol; a cross-linking agent (e.g., melamine resin); a solvent; an optional surfactant; and an optional catalyst. In an embodiment, the device 10 is a printable medium formed without the optional conductive features 16. The printable medium can, at a later time, be employed in a printing process wherein a printer, such as an inkjet printer, is employed to print the conductive features 16 thereon.

The device can be prepared by any suitable or desired method. In embodiments, a process for forming conductive features on a substrate comprises depositing an interlayer onto a substrate; curing the interlayer to form an interlayer film; depositing a conductive composition onto the interlayer film to form deposited features; and heating (or annealing) the deposited features to form conductive features.

Any suitable or desired material can be used to form the conductive features. In embodiments, the conductive features are formed using a nanoparticle conductive ink composition that comprises metal nanoparticles comprising at least one metal selected from the group consisting of Al, Ag, Au, Pt, Pd, Cu, Co, Cr, In and Ni.

As an example Xerox Corporation has developed suitable ink jet inks, flexographic inks, and gravure inks based on silver nanoparticle technology. These inks can be selected for embodiments herein. U.S. Patent Publication 2014/0312284 (patent application Ser. No. 13/866,704, which is hereby incorporated by reference herein in its entirety, describes in the Abstract thereof a nanosilver ink composition including silver nanoparticles; a small amount of polymeric material (optional) and an ink vehicle. A process for preparing a nanosilver ink composition is described comprising combining silver nanoparticles, a small amount of polymeric material (optional) and an ink vehicle. A process for forming conductive features on a substrate using ink jet printing processes is described comprising providing a nanosilver ink composition comprising silver nanoparticles; a small amount of polymeric material (optional) and an ink vehicle; depositing the nanosilver ink composition onto a substrate to form deposited features; and heating the deposited features on the substrate to form conductive features on the substrate.

U.S. Pat. No. 8,324,294, which is hereby incorporated by reference herein in its entirety, describes in the Abstract thereof a nanosilver ink composition including silver nanoparticles; a resin; and an ink vehicle. A process for forming conductive features on a substrate is described including providing a nanosilver ink composition comprising silver nanoparticles, a resin and an ink vehicle; depositing the nanosilver ink composition onto a substrate to form deposited features; and heating the deposited features on the substrate to form conductive features on the substrate. Inks have been successfully formulated in non-polar solvents such as decalin and bicyclohexyl and successfully printed using inkjet printing technologies.

The interlayer and any layer or layers including conductive layers disposed thereon can be provided using any suitable or desired method. In embodiments, depositing the interlayer comprises solution depositing the interlayer, and wherein, in embodiments, solution depositing comprises a method selected from the group consisting of spin coating, dip coating, spray coating, slot die coating, flexographic printing, offset printing, screen printing, gravure printing, ink jet printing, and combinations thereof.

The depositing of the interlayer composition, and/or optionally the nanoparticle ink composition or other layers provided on the device, may be performed for example, by solution depositing. Solution depositing, for example, refers to a process where a liquid is deposited upon the substrate to form a coating or layer. This is in contrast to vacuum depositing processes. The present processes are also different from other solution-based processes, for example electroplating, which requires a plate to remain immersed in a solution and also requires exposure to an electric current to form a metal coating on the plate. The present process also offers several advantages compared to other process such as the decreasing the amount of waste and decreasing the amount of time necessary to coat a substrate. Solution depositing includes, for example, spin coating, dip coating, spray coating, slot die coating, flexographic printing, offset printing, screen printing, gravure printing, or ink jet printing the interlayer composition onto the substrate.

The film formed from the interlayer composition can be coated at any suitable or desired thickness. In embodiments, the final film thickness of the dried interlayer after any curing process is performed is from about 0.1 to about 5 micrometers, or from about 0.5 to about 3 micrometers, or from about 0.75 to about 1 micrometers. In a specific embodiment, the coating thickness of the interlayer is from about 0.2 to about 1 micrometer. As would be understood by one of ordinary skill in the art, most or all of the solvent in the wet compositions of the present disclosure may be removed during the drying and/or curing processes. Thus, while the films of the present disclosure are formed from wet compositions comprising one or more solvents, after the curing occurs the films comprise cured compositions that contain little or no solvent.

The device can possess, in embodiments, the properties of the interlayer composition and film formed therefrom as described herein. In embodiments, the device includes a thermally cured film prepared from the interlayer composition wherein the thermally cured film possesses a water contact angle of from about 65 degrees to about 95 degrees. In embodiments, the thermally cured film possesses a surface roughness of form about 1 nanometer to about 10 nanometers. In embodiments, the thermally cured film has a glass transition temperature of from about minus 10° C. to about 100° C.

The device and process herein can comprise forming conductive features from a metal ink composition. In embodiments, the conductive composition comprises a metal nanoparticle ink composition. The fabrication of conductive features, such as an electrically conductive element, from a metal ink composition, for example, from a nanoparticle metal ink, such as a nanosilver ink composition, can be carried out by depositing the composition on a substrate using any suitable deposition technique including solution processing and flexographic and gravure printing processes at any suitable time prior to or subsequent to the formation of other optional layer or layers on the substrate. Thus deposition of the ink composition on the substrate can occur either on a substrate or on a substrate already containing layered material, for example, a substrate having disposed thereon the present interlayer composition.

The substrate may be any suitable substrate including silicon, glass plate, plastic film, sheet, fabric, or synthetic paper. For structurally flexible device plastic substrates such as polyester, polycarbonate, polyimide sheets, polyethylene terephthalate (PET) sheet, polyethylene naphthalate (PEN) sheet, and the like, may be used. The thickness of the substrate can be any suitable thickness such as about 10 micrometers to over 10 millimeters with an exemplary thickness being from about 50 micrometers to about 2 millimeters, especially for a flexible plastic substrate, and from about 0.4 to about 10 millimeters for a rigid substrate such as glass or silicon. In embodiments, the substrate is selected from the group consisting of silicon, glass plate, plastic film, sheet, fabric, paper, and combinations thereof.

Heating the deposited conductive ink composition can be to any suitable or desire temperature, such as to from about 70° C. to about 200° C., or any temperature sufficient to induce the metal nanoparticles to "anneal" and thus form an electrically conductive layer which is suitable for use as an electrically conductive element in electronic devices. The heating temperature is one that does not cause adverse changes in the properties of previously deposited layers or the substrate.

In embodiments, use of low heating temperatures allows use of low cost plastic substrates which have an annealing temperature of below 140° C.

The heating can be for any suitable or desire time, such as from about 0.01 second to about 10 hours. The heating can be performed in air, in an inert atmosphere, for example, under nitrogen or argon, or in a reducing atmosphere, for example, under nitrogen containing from about 1 to about 20 percent by volume hydrogen. The heating can also be performed under normal atmospheric pressure or at a reduced pressure of, for example, about 1000 mbars to about 0.01 mbars.

Heating encompasses any technique that can impart sufficient energy to the heated material or substrate to (1) anneal the metal nanoparticles and/or (2) remove an optional stabilizer (such as any of the stabilizers discussed herein) from the metal nanoparticles. Examples of heating techniques include thermal heating (for example, at hot plate, an oven, and a burner), infra-red ("IR") radiation, laser beam, flash light, microwave radiation, or ultraviolet ("UV") radiation, or a combination thereof.

In embodiments, after heating, the resulting electrically conductive line has a thickness ranging from about 0.1 to about 20 micrometers, or from about 0.15 to about 10 micrometers. In certain embodiments, after heating, the resulting electrically conductive line has a thickness of from about 0.1 to about 2 micrometers.

The conductivity of the resulting metal element produced by heating the deposited metal ink composition can range from about 100 Siemens/centimeter (S/cm) to about 100,000 S/cm or more. For example, the conductivity can be more than 100 Siemens/centimeter (S/cm), more than 1,000 S/cm, more than 2,000 S/cm, more than 5,000 S/cm, more than 10,000 S/cm, or more than 50,000 S/cm, The resulting elements can be used for any suitable or desired application, such as for electrodes, conductive pads, electrical interconnects, conductive lines, conductive tracks, and the like, in electronic devices such as thin film transistors, organic light emitting diodes, RFID tags, photovoltaic, displays, printed antenna, and other electronic devise which required conductive elements or components.

EXAMPLES

The following ingredients were used to make four example interlayer coating compositions, as shown in Table 1 below.

a) 20% Neopentyl Glycol diglycidyl Ether (NPGDE, from Sigma Aldrich) in propylene glycol methyl ethyl acetate (PGMEA)
b) 10% Poly(4-vinyl) phenol (PVP~25K, from Sigma Aldrich) in propylene glycol methyl ethyl acetate (PGMEA).
c) Poly(melamine co-formaldehyde), methylated 84 wt% solution in 1-butanol (MMF)
d) 2-(3,4-Epoxycyclohexyl) ethyltriethoxysilane (from Gelest SIE4668.0)
e) 2-(3,4-Epoxycyclohexyl) ethyltrimethoxysilane (Gelest SIE4670.0)

TABLE 1

Interlayer coating solution formulations

| Example | NPGDE (wt %) | PMMF (wt %) | PVP (wt %) | SIE4668 (wt %) | Sie4670 (wt %) | PGMEA (wt %) | Solid (wt %) |
|---|---|---|---|---|---|---|---|
| Comparative Example 1 | 3.98 | 0.85 | 7.94 | | | 87.23 | 12.77 |
| Example 1 | 3.98 | 0.85 | 7.94 | 7.67 | | 79.58 | 20.44 |
| Comparative Example 2 | 3.92 | 2.34 | 7.82 | | | 85.92 | 14.08 |
| Example 2 | 3.92 | 2.34 | 7.82 | | 8.33 | 77.59 | 22.41 |

Figure 2A:
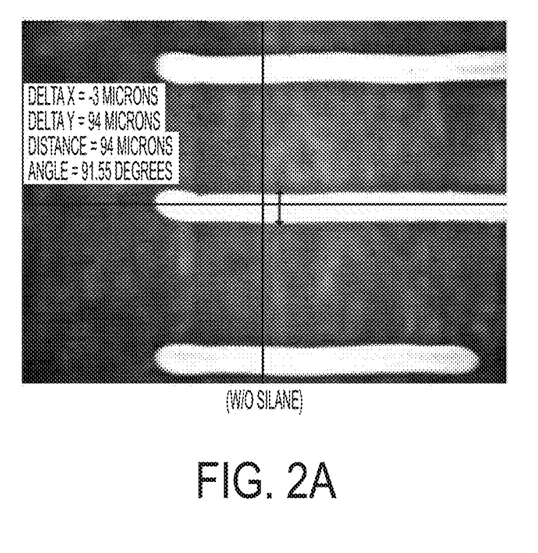
FIG. 2A shows printed nano Ag ink line images cured at 160° C. for one hour without loading silane, according to an example of the present disclosure.
Figure 2B:
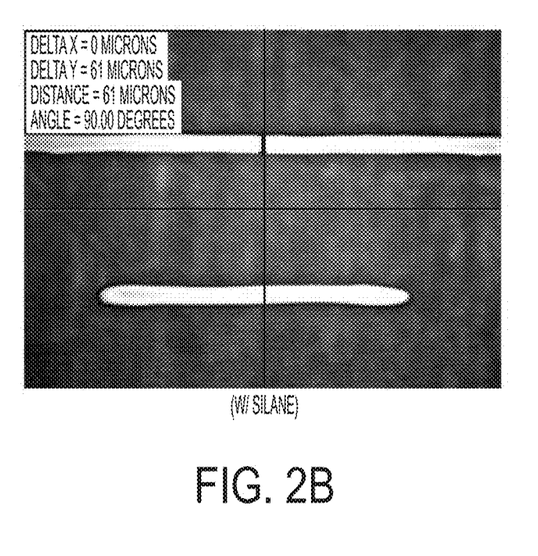
FIG. 2B shows printed nano Ag ink line images cured at 160° C. for one hour loaded with 2-(3,4-Epoxycylohexyl) ethyltriethoxysilane (SIE4668.0), according to an example of the present disclosure.

Each of the formulations of Table 1 was coated on microscope pre-cleaned glass using SCS P6700 Spin-coater. The coating speed was set at 100 rpm for 5 seconds, then increased to 1600 rpm and kept at this speed for 60 seconds. A first set of the coated samples for each formulation was pre-cured at 100° C. for 10 minutes, followed by curing at 160° C. for one hour. A second set of the coated samples for each formulation was pre-cured at 100° C. for 10 minutes, the same as the first set, followed by curing at 160° C. for three hours, Silver-nano particle inks were printed on all samples with a Dimatix DMP2800 equipped with a 10 pL cartridge. All nozzles worked well, forming spherical drops. FIGS. 2A and 2B show images of nano-silver ink printed on an interlayer made from the formulations of Comparative Example 1 and Example 1, respectively, where the interlayer was cured at 160° C. for one hour. As shown in FIG. 2A, the interlayer made from the formulation of Comparative Example 1, having no silane, gave comparatively wide printed lines (94 μm). As shown in FIG. 2B, the interlayer made from the formulation of Example 1, loaded with an epoxy having a triethoxysilane component (2-(3,4-Epoxycyclohexyl) ethyltriethoxysilane (SIE4668.0)), gave straight lines with uniform line edges and a line width of 61 μm. The comparatively narrow printed line width achieved using the interlayer of Example 1 was considered a good result.

Figure 3A:
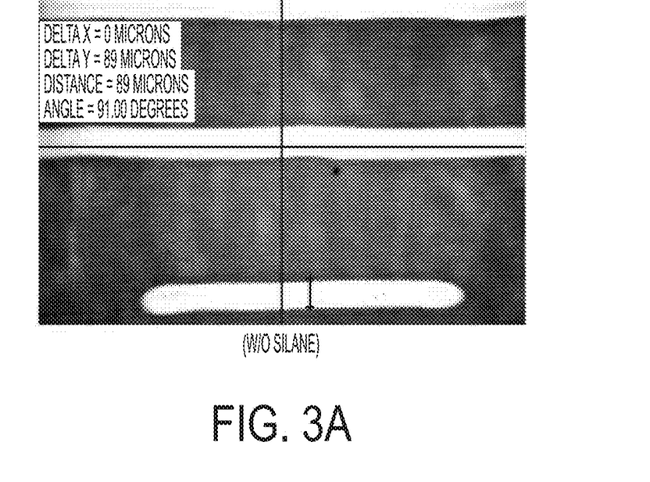
FIG. 3A shows printed nano Ag ink line images cured at 160° C. for three hours without loading silane, according to an example of the present disclosure.
Figure 3B:
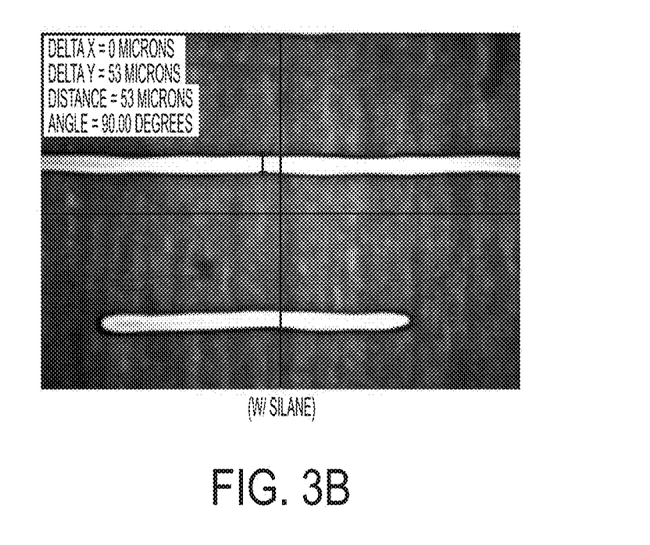
FIG. 3B shows printed nano Ag ink line images cured at 160° C. for three hours loaded with 2-(3,4-Epoxycyclohexyl) ethyltriethoxysilane (SIE4668.0), according to an example of the present disclosure.

FIG. 3A and FIG. 3B show images printed on interlayers that were also made from the formulations of Comparative Example 1 and Example 1, respectively. The process was the same as described above for FIGS. 2A and 2B, except that the interlayer was cured for 3 hours instead of just 1 hour. The results were very close to those described for FIG. 2, the interlayer of Example 1 resulting in improved, relatively narrower printed lines compared to the interlayer of Comparative Example 1.

Figure 4A:
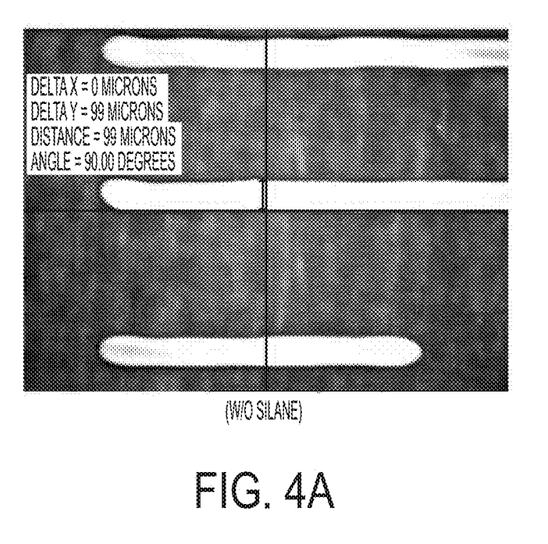
FIG. 4A shows printed nano Ag ink line images cured at 160° C. for one hour without loading silane, according to an example of the present disclosure.
Figure 4B:
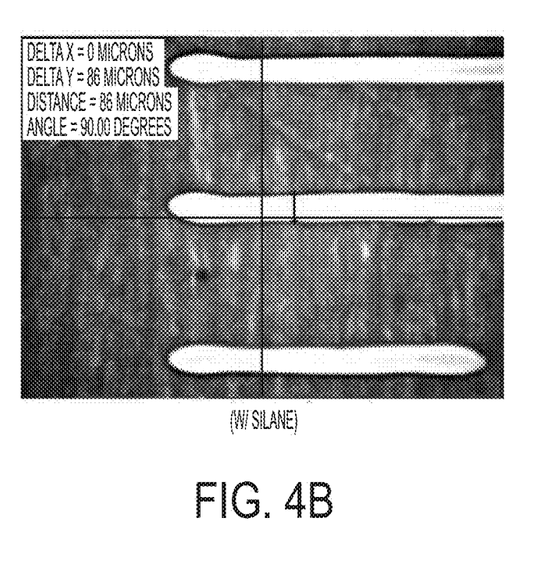
FIG. 4B shows printed nano Ag ink line images cured at 160° C. for one hour loaded with 2-(3,4-Epoxycyolohexyl) ethyltrimethoxysilane (SIE4670.0), according to an example of the present disclosure.
Figure 5A:
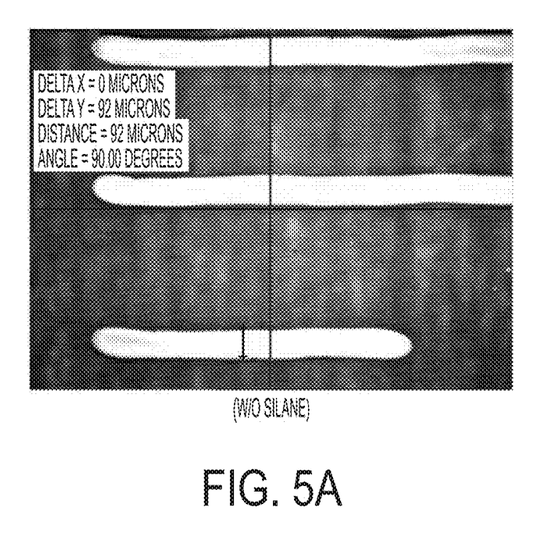
FIG. 5A shows printed nano Ag ink line images cured at 160° C. for three hours without loading silane, according to an example of the present disclosure.
Figure 5B:
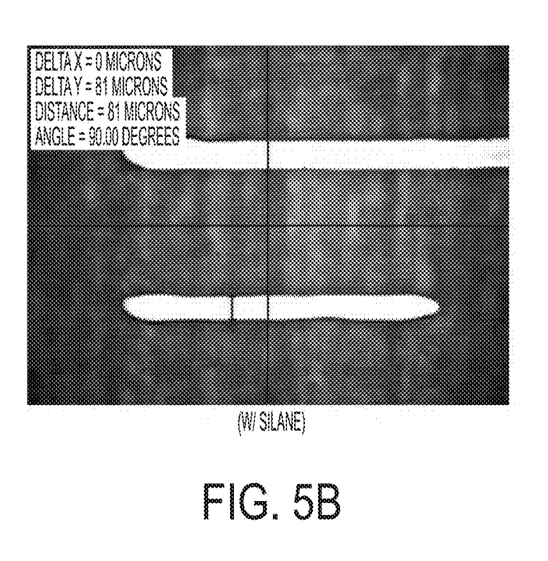
FIG. 5B shows printed nano Ag ink line images cured at 160° C. for three hours loaded with 2-(3,4-Epoxycyclohexyl) ethyltrimethoxysilane (SIE4670.0), according to an example of the present disclosure.

FIGS. 4A and 5A show images of nano-silver ink printed on an interlayer made from the formulations of Comparative Example 2 (made without silane substituted epoxy). FIGS. 4B and 5B show images of nano-silver ink printed on an interlayer made from the formulations of Example 2 (loaded with 2-(3,4-Epoxycyclohexyl) ethyltrimethoxysilane (SIE4670.0)). The printed nano Ag ink line images of FIGS. 4A and 48 were cured at 160° C. for one hour, while those of FIGS. 5A and 58 were cured at 160° C. for three hours. Use of the epoxy substituted with trimethoxysilane substituted epoxy gave a slight decrease in linewidth compared to samples with no silane. The epoxy substituted with trimethoxysilane used in the formulations of Example 2 was not as effective at reducing line width as the epoxy substituted with triethoxysilane that was used in Example 1.

The resistance of the printed lines made from the formulations of Examples 1 and 2 were measured using a Keithley SCS-4200 Parameter Analyzer. Step height and width of the printed lines were measured using Bruker DektakXT Surface Profilometer. The conductivity was calculated based on the resistivity measurement. Resistivity was calculated as ohms×height×width/length and Conductivity was calculated as 1/resistivity. Results are shown in Table 2 below. These results show that printing line conductivity was not substantially affected by the interlayer coating.

TABLE 2 summarized the resistivity and conductivity resuts

| Example Formulation from which interlayer was made | Resistivity (Ohm-cm) | Conductivity (Ohms$^{-1}$/cm) |
|---|---|---|
| Control - No Interlayer Coated on glass substrate | 1.07E−05 | 9.34E+04 |
| Comparative Example 1 | 1.01E−05 | 9.90E+04 |
| Example 1 | 1.10E−05 | 9.10E+04 |
| Comparative Example 2 | 9.86E−06 | 1.01E+05 |
| Example 2 | 8.35E−06 | 1.20E+05 |

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is ideal.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompasses by the following claims.

What is claimed is:

1. A composition formed from ingredients comprising: an epoxy; a polyvinyl phenol; a cross-linking agent; an epoxy silane; and a solvent, wherein the epoxy comprises an aliphatic epoxy compound or epoxy polymer made therefrom, where the aliphatic epoxy compound is:

(a) a compound of formula 1:

Y is selected from the group consisting of a glycidyl group, epoxy group, oxyalkyl (—OR) group and hydroxyl group, where R is an alkyl; $R^1$ is a hydrogen atom, alkyl, or —$OR^2$, where $R^2$ is a $C_1$ to $C_3$ alkyl or an epoxy group; m equals 1; n ranges from 1 to 20 and q equals 1; wherein X is selected from the group consisting of:

(b) the aliphatic epoxy compound has a formulae:

where n is from 1 to 15.

2. The composition of claim 1, wherein the polyvinyl phenol is selected from the group consisting of poly(4-vinylphenol), poly-p-vinylphenol, poly(vinylphenol)/poly(methyl acrylate), poly(vinylphenol)/poly(methyl methacrylate), poly(4-vinylphenol)/poly(vinyl methyl ketone), and combinations thereof.

3. The composition of claim 1, wherein the cross-linking agent is a melamine resin.

4. The composition of claim 3, wherein the melamine resin comprises a poly(melamine-co-formaldehyde) based polymer.

5. The composition of claim 4, wherein the poly(melamine-co-formaldehyde) based polymer is selected from the group consisting of methylated poly(melamine-co-formaldehyde), butylated poly(melamine-co-formaldehyde), isobutylated poly(melamine-co-formaldehyde), acrylated poly(melamine-co-formaldehyde), methylated/butylated poly(melamine-co-formaldehyde), and combinations thereof.

6. The composition of claim 1, wherein the solvent is selected from the group consisting of propylene glycol methyl ether acetate, toluene, methyl isobutyl ketone, butylacetate, methoxypropylacetate, xylene, tripropyleneglycol monomethylether, dipropyleneglycol monomethylether, propoxylated neopentylglycoldiacrylate, and combinations thereof.

7. The composition of claim 1, wherein the epoxy silane is chosen from compounds of formula 3 or 4:

(3)

(4)

wherein $R^3$, $R^4$ and $R^5$ are independently selected from the group consisting of alkyl groups and —$OR^6$ groups, where $R^6$ is an alkyl group; y ranges from 0 to 10 and z ranges from 1 to 12.

8. The composition of claim 1, wherein the epoxy silane is selected from the group consisting of 2-(3,4-Epoxycyclohexyl)-ethyltrimethoxysilane, 2-(3,4-Epoxycyclohexyl)-ethyltriethoxysilane, Tris(dodecycloxyl)(2-{7-oxabicyclo[4.1.0]heptan-3-yl}silane, 3-(2,3-Epoxypropoxypropyl)-methyldiethoxysilane, 3-(2,3-Epoxypropoxypropyl)-methyldimethoxysilane, 3-(2,3-Epoxypropoxypropyl)trimethoxysilane, 3-(2,3-Epoxypropoxypropyl)triethoxysilane, and combinations thereof.

9. The composition of claim 1, further comprising at least one ingredient chosen from a surface leveling agent and a surfactant.

10. A printable medium comprising:
a substrate; and
a film on the substrate, the film comprising a cured composition formed from ingredients comprising:
an epoxy;
a polyvinyl phenol;
a cross-linking agent;
an epoxy silane; and
a solvent, wherein the film possesses a water contact angle of from about 65 degrees to about 95 degrees and a surface roughness of from about 1 nanometer to about 10 nanometers.

11. The printable medium of claim 10, wherein the substrate comprises a material selected from the group consisting of silicon, glass plate, plastic film, sheet, fabric, synthetic paper, and combinations thereof.

12. The printable medium of claim 10, wherein the film has a thickness of from about 0.1 micron to about 5 microns.

13. A device comprising:
a substrate;
a film on the substrate, the film comprising a cured composition formed from ingredients comprising:
an epoxy;
a polyvinyl phenol;
a cross-linking agent;
an epoxy silane; and
a solvent; and
a conductive feature on the film,
wherein the conductive feature comprises an electrically conductive material formed from a nanoparticle conductive ink composition.

14. The device of claim 13, wherein the nanoparticle conductive ink composition comprises metal nanoparticles comprising at least one metal selected from the group consisting of Al, Ag, Au, Pt, Pd, Cu, Co, Cr, In and Ni.

* * * * *